United States Patent
Anderson et al.

(10) Patent No.: US 11,130,696 B2
(45) Date of Patent: Sep. 28, 2021

(54) METHODS FOR RECONDITIONING GLASS MANUFACTURING SYSTEMS

(71) Applicant: Corning Incorporated, Corning, NY (US)

(72) Inventors: Sean Thomas Anderson, Corning, NY (US); Gilbert De Angelis, Lindley, NY (US); Megan Aurora DeLamielleure, Corning, NY (US); Miki Eugene Kunitake, Elmira, NY (US); Derwin Lee Lamberson, Painted Post, NY (US)

(73) Assignee: Corning Incorporated, Corning, NY (US)

(*) Notice: Subject to any disclaimer, the term of this patent is extended or adjusted under 35 U.S.C. 154(b) by 82 days.

(21) Appl. No.: 16/620,036

(22) PCT Filed: Jun. 1, 2018

(86) PCT No.: PCT/US2018/035693
§ 371 (c)(1),
(2) Date: Dec. 6, 2019

(87) PCT Pub. No.: WO2018/226535
PCT Pub. Date: Dec. 13, 2018

(65) Prior Publication Data
US 2020/0199003 A1    Jun. 25, 2020

Related U.S. Application Data

(60) Provisional application No. 62/515,796, filed on Jun. 6, 2017.

(51) Int. Cl.
*C03B 5/42* (2006.01)
*C03B 5/26* (2006.01)
(Continued)

(52) U.S. Cl.
CPC .............. *C03B 5/262* (2013.01); *C03B 5/027* (2013.01); *C03B 5/225* (2013.01); *C03B 5/43* (2013.01)

(58) Field of Classification Search
CPC ............ C03B 5/262; C03B 5/42; C03B 5/425
See application file for complete search history.

(56) References Cited

U.S. PATENT DOCUMENTS

| 2,455,907 A | 12/1948 | Slayter | |
| 3,238,030 A * | 3/1966 | O'Connell | C03B 5/42 65/27 |

(Continued)

FOREIGN PATENT DOCUMENTS

| CN | 101326129 A | 12/2008 |
| CN | 106242246 A | 12/2016 |

(Continued)

OTHER PUBLICATIONS

International Search Report and Written Opinion of the International Searching Authority; PCT/US2018/035693; dated Aug. 31, 2018; 7 Pages; US Commissioner for Patents.

(Continued)

*Primary Examiner* — Cynthia Szewczyk
(74) *Attorney, Agent, or Firm* — Matthew J. Mason

(57) ABSTRACT

A method for reconditioning a glass manufacturing system includes establishing a reducing atmosphere in a glass melting vessel and draining a glass melt composition from the melting vessel while the reducing atmosphere is in the vessel. The pressure of the reducing atmosphere is greater than the pressure of the atmosphere surrounding the melting vessel and the reducing atmosphere is established by operating at least one combustion burner in the melting vessel in a fuel-rich condition.

20 Claims, 4 Drawing Sheets

(51) Int. Cl.
    *C03B 5/027*     (2006.01)
    *C03B 5/225*     (2006.01)
    *C03B 5/43*     (2006.01)

(56)     References Cited

U.S. PATENT DOCUMENTS

| | | | |
|---|---|---|---|
| 3,871,853 A * | 3/1975 | Dietz | C03C 4/0071 |
| | | | 65/32.5 |
| 5,573,564 A | 11/1996 | Richards | |
| 5,659,564 A | 8/1997 | Elliott | |
| 2010/0313604 A1 | 12/2010 | Watson et al. | |
| 2011/0016919 A1 | 1/2011 | Goller et al. | |
| 2011/0203321 A1 | 8/2011 | De et al. | |

FOREIGN PATENT DOCUMENTS

| | | |
|---|---|---|
| JP | 2005-132713 A | 5/2005 |
| JP | 2010-168279 A | 8/2010 |
| JP | 05263719 B2 | 8/2013 |
| JP | 05849971 B2 | 2/2016 |
| KR | 10-2005-0035070 A | 4/2005 |
| KR | 10-2016-0051200 A | 5/2016 |
| WO | 2012/093563 A1 | 7/2012 |
| ZA | 200201227 | 8/2002 |

OTHER PUBLICATIONS

Chinese Patent Application No. 201880037907.1, Office Action dated Mar. 3, 2021, 5 pages (English Translation Only); Chinese Patent Office.

* cited by examiner

METHODS FOR RECONDITIONING GLASS MANUFACTURING SYSTEMS

This application claims the benefit of priority under 35 U.S.C. § 371 of International Application Serial No. PCT/US2018/035693, filed Jun. 1, 2018, which claims the benefit of priority under 35 U.S.C. § 119 of U.S. Provisional Application Ser. No. 62/515,796 filed on Jun. 6, 2017, the content of which is relied upon and incorporated herein by reference in its entirety.

FIELD

The present disclosure relates generally to methods for reconditioning glass manufacturing systems and more particularly to methods for reconditioning glass manufacturing systems with reduced downtime and expense.

BACKGROUND

In the production of glass articles, such as glass sheets for display applications, including televisions and hand held devices, such as telephones and tablets, raw materials are typically melted into molten glass, which is in, turn, formed and cooled to make the intended glass article. At times, it may be desirable to change the composition of the molten glass being processed through a glass melt system, for example, if sales are down for one product but up for another.

One method of changing compositions of molten glass being processed through a glass melt system involves gradually transitioning between different batch compositions without draining the system. Due to, for example, stability considerations resulting from processing intermediate molten glass compositions, such conversions can be expected to take considerable amounts of time and may not be possible in some circumstances due to, for example, incompatibility between intermediate compositions and certain processing components. Such intermediate compositions are also typically not saleable.

Another method of changing compositions of molten glass being processed through a glass melt system involves draining the old composition from the system prior to introducing the new composition. Depending on the circumstances, such conversions may be performed more rapidly than gradually transitioning between two different batch compositions, as described above. However, such conversions may result in the sacrifice of processing equipment that is incompatible with a drained system. Because of this incompatibility, replacement processing equipment may not be introduced into a system until it has been recharged with the new composition, typically requiring time, expense, and complexity.

SUMMARY

Embodiments disclosed herein include a method for reconditioning a glass manufacturing system. The method includes establishing a reducing atmosphere in a glass melting vessel. The method also includes draining a glass melt composition from the glass melting vessel while the reducing atmosphere is in the glass melting vessel. A pressure of the reducing atmosphere in the glass melting vessel is greater than a pressure of an atmosphere surrounding the glass melting vessel. In addition, establishing the reducing atmosphere in the glass melting vessel comprises operating at least one combustion burner in the glass melting vessel in a fuel-rich condition.

Embodiments disclosed herein may also include those in which the glass melting vessel is in fluid communication with a downstream glass manufacturing apparatus including a fining vessel. During the step of draining the glass melt composition from the glass melting vessel, a pressure of an atmosphere in the fining vessel is greater than the pressure of the reducing atmosphere in the glass melting vessel.

Embodiments disclosed herein may further include those wherein the glass melting vessel includes at least one electrode comprising molybdenum and the fining vessel comprises platinum or an alloy thereof.

Additional features and advantages of the embodiments disclosed herein will be set forth in the detailed description which follows, and in part will be readily apparent to those skilled in the art from that description or recognized by practicing the disclosed embodiments as described herein, including the detailed description which follows, the claims, as well as the appended drawings.

It is to be understood that both the foregoing general description and the following detailed description present embodiments intended to provide an overview or framework for understanding the nature and character of the claimed embodiments. The accompanying drawings are included to provide further understanding, and are incorporated into and constitute a part of this specification. The drawings illustrate various embodiments of the disclosure, and together with the description serve to explain the principles and operations thereof.

DETAILED DESCRIPTION

Figure 1:
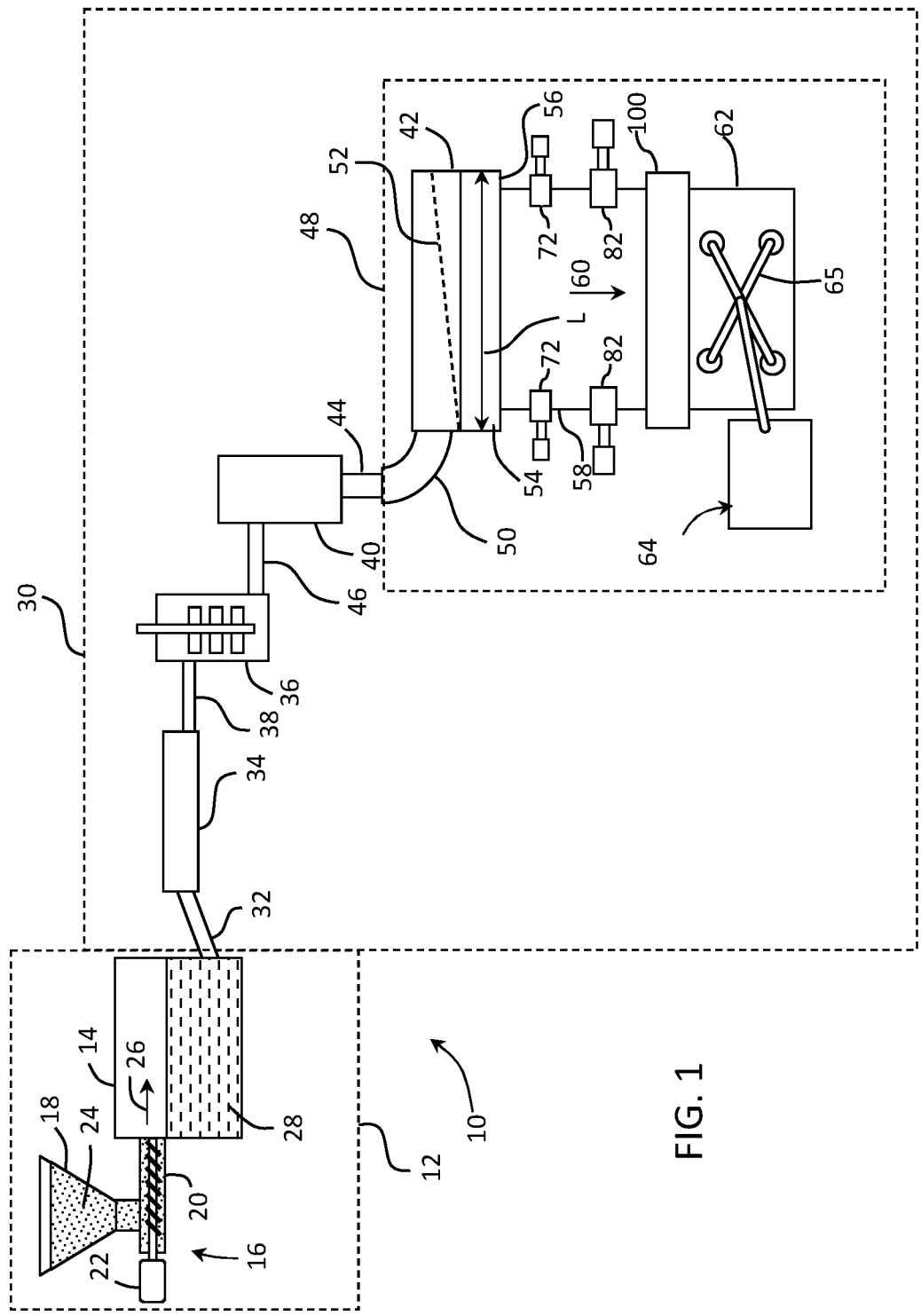
FIG. 1 is a schematic view of an example fusion down draw glass making apparatus and process.

Reference will now be made in detail to the present preferred embodiments of the present disclosure, examples of which are illustrated in the accompanying drawings. Whenever possible, the same reference numerals will be used throughout the drawings to refer to the same or like parts. However, this disclosure may be embodied in many different forms and should not be construed as limited to the embodiments set forth herein.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

As used herein, the term "glass melt composition" refers to a composition from which a glass article is made, wherein the composition may exist in any state between and including a substantially solid state and a substantially liquid state, such any state between and including raw materials and molten glass, including any degree of partial melting there between.

As used herein, the term "melting operation" refers to an operation in which a glass melt composition is heated from a substantially solid state to a substantially liquid state so as to convert raw materials into molten glass.

As used herein, the term "reconditioning a glass manufacturing system" refers to a process that includes draining a glass melt composition from a glass melting vessel, wherein the glass melting vessel may recharged with at least one same or different glass melt composition(s) after the initial glass melt composition has been fully or partially drained from the glass melting vessel. Optionally, the glass melting vessel may not be recharged with a glass melt composition after draining the glass melt composition from the glass melting vessel.

As used herein, the term "atmosphere in a glass melting vessel" refers to a gaseous atmosphere in a glass melting vessel, such as a gaseous atmosphere above molten glass in a glass melting vessel.

As used herein, the term "atmosphere in a fining vessel" refers to a gaseous atmosphere in fining vessel, such as a gaseous atmosphere above molten glass in a fining vessel.

As used herein, the term "reducing atmosphere" refers to an atmosphere, such as an atmosphere in a glass melting vessel, having an oxygen concentration of less than about 1000 parts per million (ppm), such as an oxygen concentration of from about 0 ppm to about 500 ppm and all ranges and sub-ranges there between, including, for example, an oxygen concentration of less than about 300 ppm, such as from about 10 ppm to about 300 ppm, including from about 20 ppm to about 200 ppm, and further such as an atmosphere that is substantially free of oxygen.

As used herein, the term" operating a combustion burner in a fuel-rich condition" refers to operating a combustion burner, such as a combustion burner in a glass melting vessel, in excess of a stoichiometric ratio of fuel (e.g., natural gas, propane, etc.) to oxygen.

Shown in FIG. 1 is an exemplary glass manufacturing apparatus 10. In some examples, the glass manufacturing apparatus 10 can comprise a glass melting furnace 12 that can include a melting vessel 14. In addition to melting vessel 14, glass melting furnace 12 can optionally include one or more additional components such as heating elements (e.g., combustion burners or electrodes) that heat raw materials and convert the raw materials into molten glass. In further examples, glass melting furnace 12 may include thermal management devices (e.g., insulation components) that reduce heat lost from a vicinity of the melting vessel. In still further examples, glass melting furnace 12 may include electronic devices and/or electromechanical devices that facilitate melting of the raw materials into a glass melt. Still further, glass melting furnace 12 may include support structures (e.g., support chassis, support member, etc.) or other components.

Glass melting vessel 14 is typically comprised of refractory material, such as a refractory ceramic material, for example a refractory ceramic material comprising alumina or zirconia. In some examples glass melting vessel 14 may be constructed from refractory ceramic bricks. Specific embodiments of glass melting vessel 14 will be described in more detail below.

In some examples, the glass melting furnace may be incorporated as a component of a glass manufacturing apparatus to fabricate a glass substrate, for example a glass ribbon of a continuous length. In some examples, the glass melting furnace of the disclosure may be incorporated as a component of a glass manufacturing apparatus comprising a slot draw apparatus, a float bath apparatus, a down-draw apparatus such as a fusion process, an up-draw apparatus, a press-rolling apparatus, a tube drawing apparatus or any other glass manufacturing apparatus that would benefit from the aspects disclosed herein. By way of example, FIG. 1 schematically illustrates glass melting furnace 12 as a component of a fusion down-draw glass manufacturing apparatus 10 for fusion drawing a glass ribbon for subsequent processing into individual glass sheets.

The glass manufacturing apparatus 10 (e.g., fusion downdraw apparatus 10) can optionally include an upstream glass manufacturing apparatus 16 that is positioned upstream relative to glass melting vessel 14. In some examples, a portion of, or the entire upstream glass manufacturing apparatus 16, may be incorporated as part of the glass melting furnace 12.

As shown in the illustrated example, the upstream glass manufacturing apparatus 16 can include a storage bin 18, a raw material delivery device 20 and a motor 22 connected to the raw material delivery device. Storage bin 18 may be configured to store a quantity of raw materials 24 that can be fed into melting vessel 14 of glass melting furnace 12, as indicated by arrow 26. Raw materials 24 typically comprise one or more glass forming metal oxides and one or more modifying agents. In some examples, raw material delivery device 20 can be powered by motor 22 such that raw material delivery device 20 delivers a predetermined amount of raw materials 24 from the storage bin 18 to melting vessel 14. In further examples, motor 22 can power raw material delivery device 20 to introduce raw materials 24 at a controlled rate based on a level of molten glass sensed downstream from melting vessel 14. Raw materials 24 within melting vessel 14 can thereafter be heated to form molten glass 28.

Glass manufacturing apparatus 10 can also optionally include a downstream glass manufacturing apparatus 30 positioned downstream relative to glass melting furnace 12. In some examples, a portion of downstream glass manufacturing apparatus 30 may be incorporated as part of glass melting furnace 12. In some instances, first connecting conduit 32 discussed below, or other portions of the downstream glass manufacturing apparatus 30, may be incorporated as part of glass melting furnace 12. Elements of the downstream glass manufacturing apparatus, including first connecting conduit 32, may be formed from a precious metal. Suitable precious metals include platinum group metals selected from the group of metals consisting of platinum, iridium, rhodium, osmium, ruthenium and palladium, or alloys thereof. For example, downstream components of the glass manufacturing apparatus may be formed from a platinum-rhodium alloy including from about 70 to about 90% by weight platinum and about 10% to about 30% by weight rhodium. However, other suitable metals can include molybdenum, palladium, rhenium, tantalum, titanium, tungsten and alloys thereof.

Downstream glass manufacturing apparatus 30 can include a first conditioning (i.e., processing) vessel, such as fining vessel 34, located downstream from melting vessel 14 and coupled to melting vessel 14 by way of the above-referenced first connecting conduit 32. In some examples, molten glass 28 may be gravity fed from melting vessel 14 to fining vessel 34 by way of first connecting conduit 32. For instance, gravity may cause molten glass 28 to pass through an interior pathway of first connecting conduit 32 from melting vessel 14 to fining vessel 34. It should be understood, however, that other conditioning vessels may be positioned downstream of melting vessel 14, for example between melting vessel 14 and fining vessel 34. In some embodiments, a conditioning vessel may be employed between the melting vessel and the fining vessel wherein molten glass from a primary melting vessel is further heated to continue the melting process, or cooled to a temperature lower than the temperature of the molten glass in the melting vessel before entering the fining vessel.

Bubbles may be removed from molten glass 28 within fining vessel 34 by various techniques. For example, raw materials 24 may include multivalent compounds (i.e. fining agents) such as tin oxide that, when heated, undergo a chemical reduction reaction and release oxygen. Other suitable fining agents include without limitation arsenic, antimony, iron and cerium. Fining vessel 34 is heated to a temperature greater than the melting vessel temperature, thereby heating the molten glass and the fining agent. Oxygen bubbles produced by the temperature-induced chemical reduction of the fining agent(s) rise through the molten glass within the fining vessel, wherein gases in the molten glass produced in the melting furnace can diffuse or coalesce into the oxygen bubbles produced by the fining agent. The enlarged gas bubbles can then rise to a free surface of the molten glass in the fining vessel and thereafter be vented out of the fining vessel. The oxygen bubbles can further induce mechanical mixing of the molten glass in the fining vessel.

Downstream glass manufacturing apparatus 30 can further include another conditioning vessel such as a mixing vessel 36 for mixing the molten glass. Mixing vessel 36 may be located downstream from the fining vessel 34. Mixing vessel 36 can be used to provide a homogenous glass melt composition, thereby reducing cords of chemical or thermal inhomogeneity that may otherwise exist within the fined molten glass exiting the fining vessel. As shown, fining vessel 34 may be coupled to mixing vessel 36 by way of a second connecting conduit 38. In some examples, molten glass 28 may be gravity fed from the fining vessel 34 to mixing vessel 36 by way of second connecting conduit 38. For instance, gravity may cause molten glass 28 to pass through an interior pathway of second connecting conduit 38 from fining vessel 34 to mixing vessel 36. It should be noted that while mixing vessel 36 is shown downstream of fining vessel 34, mixing vessel 36 may be positioned upstream from fining vessel 34. In some embodiments, downstream glass manufacturing apparatus 30 may include multiple mixing vessels, for example a mixing vessel upstream from fining vessel 34 and a mixing vessel downstream from fining vessel 34. These multiple mixing vessels may be of the same design, or they may be of different designs.

Downstream glass manufacturing apparatus 30 can further include another conditioning vessel such as delivery vessel 40 that may be located downstream from mixing vessel 36. Delivery vessel 40 may condition molten glass 28 to be fed into a downstream forming device. For instance, delivery vessel 40 can act as an accumulator and/or flow controller to adjust and/or provide a consistent flow of molten glass 28 to forming body 42 by way of exit conduit 44. As shown, mixing vessel 36 may be coupled to delivery vessel 40 by way of third connecting conduit 46. In some examples, molten glass 28 may be gravity fed from mixing vessel 36 to delivery vessel 40 by way of third connecting conduit 46. For instance, gravity may drive molten glass 28 through an interior pathway of third connecting conduit 46 from mixing vessel 36 to delivery vessel 40.

Downstream glass manufacturing apparatus 30 can further include forming apparatus 48 comprising the above-referenced forming body 42 and inlet conduit 50. Exit conduit 44 can be positioned to deliver molten glass 28 from delivery vessel 40 to inlet conduit 50 of forming apparatus 48. For example in examples, exit conduit 44 may be nested within and spaced apart from an inner surface of inlet conduit 50, thereby providing a free surface of molten glass positioned between the outer surface of exit conduit 44 and the inner surface of inlet conduit 50. Forming body 42 in a fusion down draw glass making apparatus can comprise a trough 52 positioned in an upper surface of the forming body and converging forming surfaces 54 that converge in a draw direction along a bottom edge 56 of the forming body. Molten glass delivered to the forming body trough via delivery vessel 40, exit conduit 44 and inlet conduit 50 overflows side walls of the trough and descends along the converging forming surfaces 54 as separate flows of molten glass. The separate flows of molten glass join below and along bottom edge 56 to produce a single ribbon of glass 58 that is drawn in a draw or flow direction 60 from bottom edge 56 by applying tension to the glass ribbon, such as by gravity, edge rolls 72 and pulling rolls 82, to control the dimensions of the glass ribbon as the glass cools and a viscosity of the glass increases. Accordingly, glass ribbon 58 goes through a visco-elastic transition and acquires mechanical properties that give the glass ribbon 58 stable dimensional characteristics. Glass ribbon 58 may, in some embodiments, be separated into individual glass sheets 62 by a glass separation apparatus 100 in an elastic region of the glass ribbon. A robot 64 may then transfer the individual glass sheets 62 to a conveyor system using gripping tool 65, whereupon the individual glass sheets may be further processed.

Figure 2:
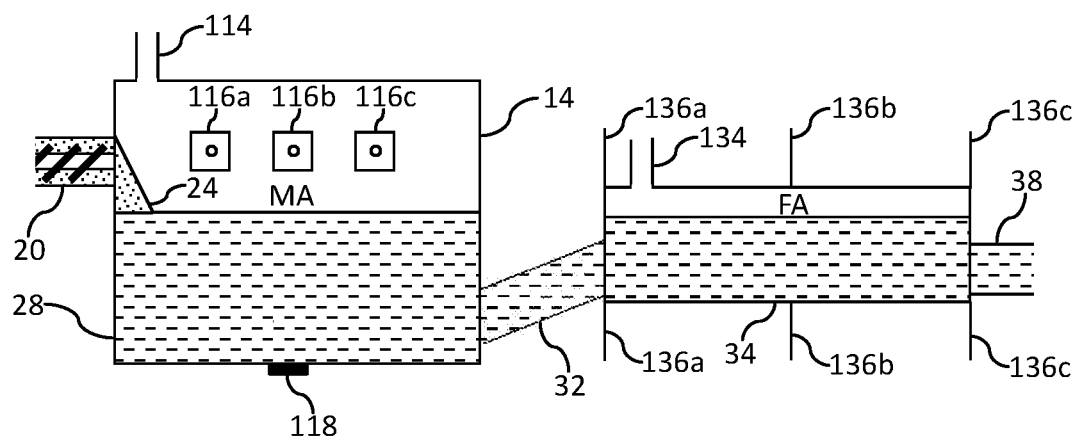
FIG. 2 is a schematic view of a portion of the example glass making apparatus and process shown in FIG. 1, wherein glass melting and fining vessels are in an operational state.

FIG. 2 shows a portion of the example glass making apparatus and process shown in FIG. 1, wherein melting vessel 14 and fining vessel 34 are in an operational state. Specifically, in FIG. 2, raw materials 24 are continually introduced to melting vessel 14 via raw material delivery device 20 (e.g., screw feeder) and melting vessel 14, first connecting conduit 32, fining vessel 34, and second connecting conduit 38, are filled to an operational level with a glass melt composition that includes molten glass 28 that flows continually between melting vessel 14, first connecting conduit 32, fining vessel 34, and second connecting conduit 38.

Figure 4:
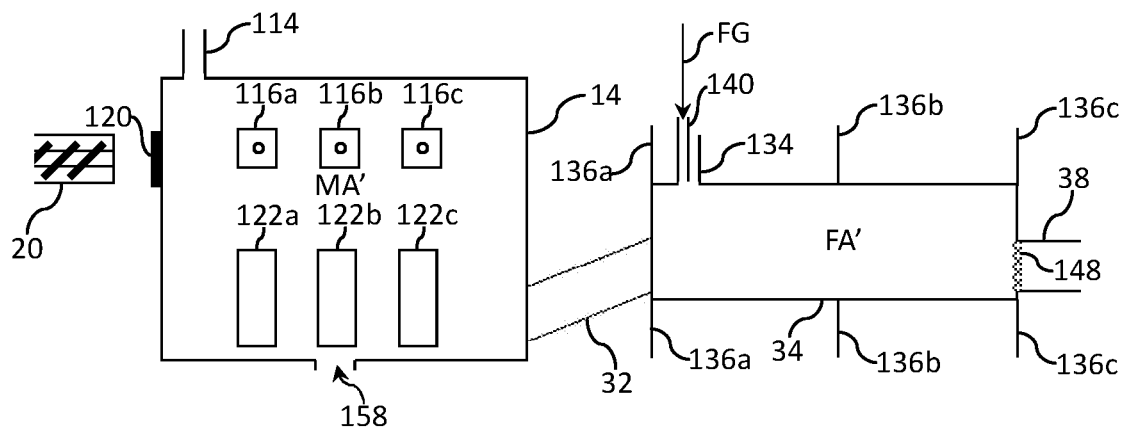
FIG. 4 is a schematic view of the portion of the example glass making apparatus and process of FIG. 2, wherein the glass melting and fining vessels are in a second reconditioning state in accordance with embodiments disclosed herein.
Figure 5:
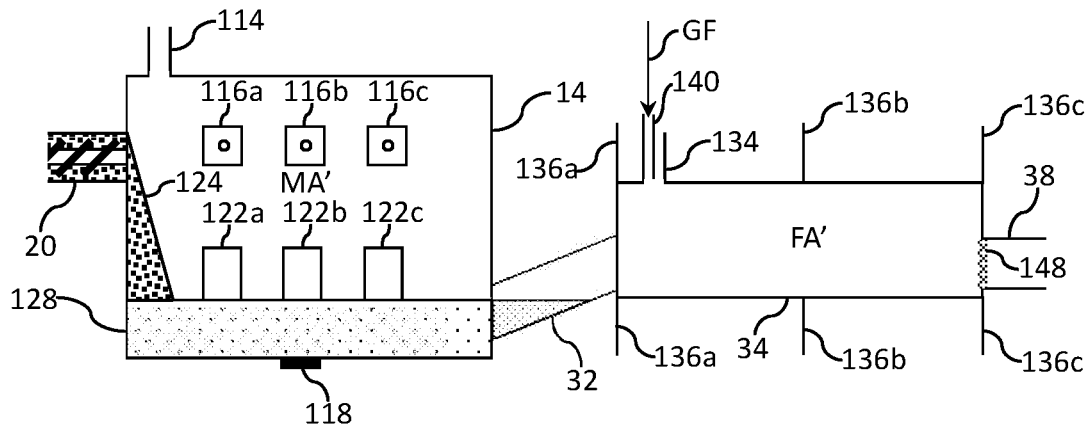
FIG. 5 is a schematic view of the portion of the example glass making apparatus and process of FIG. 2, wherein the glass melting and fining vessels are in a third reconditioning state in accordance with embodiments disclosed herein.
Figure 6:
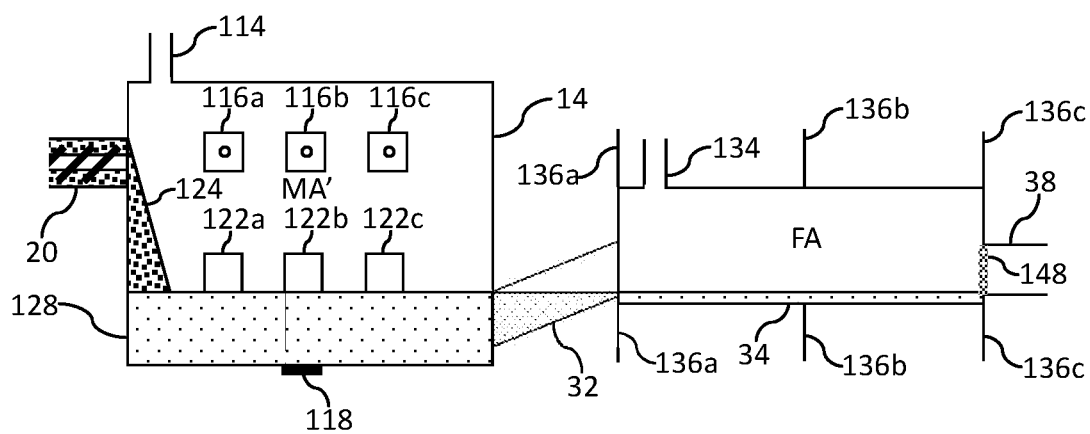
FIG. 6 is a schematic view of the portion of the example glass making apparatus and process of FIG. 2, wherein the glass melting and fining vessels are in a fourth reconditioning state in accordance with embodiments disclosed herein.

In the operational state, the temperature in the melting vessel 14, fining vessel 34, and first and second connecting conduits, 32, 38, is above the melting temperature of the glass melt composition that comprises the molten glass 28. For example, the temperature in the melting vessel 14 can be maintained via operation of one or more combustion burners (shown as 116a, 116b, and 116c in FIGS. 3-7) and/or via operation of one or more electrodes (shown as 122a, 122b, and 122c in FIGS. 4-6) and the temperature in the fining vessel 34 can be maintained via operation of flanges (shown as 136a, 136b, and 136c in FIGS. 3-7). The temperature in first and second connecting conduits, 32, 38, may, for example, also be maintained by flanges (not shown). While FIGS. 3-7 show three combustion burners and three flanges and FIGS. 4-6 show three electrodes, it is to be understood that embodiments disclosed herein are not so limited and may include any number of combustion burners, flanges, and electrodes.

In the operational state shown in FIG. 2, drain (shown as 158 in FIG. 4) of melting vessel 14 is plugged with plug 118. In addition, in the operational state, the electrodes in the melting vessel 14 are completely immersed in a glass melt composition including molten glass 28.

Moreover, in the operational state, the temperature in at least a portion of the fining vessel 34 may be maintained to be higher than a temperature in the melting vessel 14. For example, the temperature in at least a portion of the fining vessel 34 may be maintained to be at least 20° C. higher, such as at least 50° C. higher, and further such as at least 100° C. higher, including from about 20° C. to about 200° C. higher, such as from about 50° C. to about 150° C. higher than a temperature in the melting vessel 14. For example, in certain embodiments, a temperature in at least a portion of the fining vessel 34 in the operational state may range from about 1420° C. to about 1670° C. and may vary depending on the glass melt composition.

In certain exemplary embodiments in the operational state, an atmosphere (MA) (i.e., gas composition above the glass melt composition including molten glass 28) in the melting vessel 14 and/or an atmosphere (FA) in the fining vessel 34 may have approximately the same pressure as the atmosphere surrounding the melting vessel 14 and/or the fining vessel 34. In addition, in certain exemplary embodiments in the operational state, the atmosphere (MA) in the melting vessel 14 and/or the atmosphere (FA) in the fining vessel 34 may comprise approximately the same oxygen concentration as air. Melting vessel 14 can include vent 114 in fluid communication with the atmosphere in the melting vessel 14, which can in turn be in fluid communication with, for example, a pollution abatement system (not shown). Likewise, fining vessel can include vent 134 in fluid communication with the atmosphere in the fining vessel 34, which can in turn be in fluid communication with, for example, a pollution abatement system (not shown).

Figure 3:
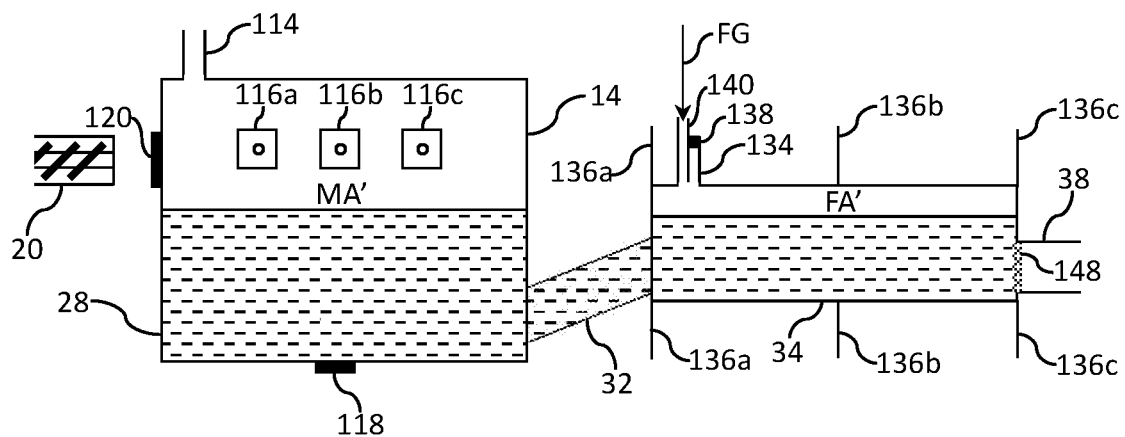
FIG. 3 is a schematic view of the portion of the example glass making apparatus and process of FIG. 2, wherein glass melting and fining vessels are in a first reconditioning state in accordance with embodiments disclosed herein.

FIG. 3 shows a portion of the example glass making apparatus and process of FIG. 2, wherein melting vessel 14 and fining vessel 34 are in a first reconditioning state in accordance with embodiments disclosed herein. In the embodiment shown in FIG. 3, raw material delivery device 20 has been disconnected from melting vessel 14 and fill area (not shown) has been plugged with plug 120. In addition, vent 134 of fining vessel 34 has been partially plugged with plug 138 and partially filled with gas inlet tube 140 through which a feed gas (FG) can be fed into fining vessel 34.

In certain exemplary embodiments, feed gas (FG) can comprise at least one inert gas, such as nitrogen, while comprising a lower concentration of oxygen than air. For example, in certain embodiments, feed gas (FG) can comprise less than about 1.0% oxygen by volume, such as from about 0.01% to about 1.0% oxygen by volume, including from about 0.05% to about 0.5% oxygen by volume. In addition, feed gas (FG) comprising less than about 1.0% oxygen by volume can, in certain exemplary embodiments, comprise at least about 99% nitrogen by volume, such as from about 99.0% to about 99.99% nitrogen by volume.

While feed gas (FG) is being fed into fining vessel 34, a reducing atmosphere (MA') is established in the melting vessel 14 by operating at least one combustion burner (e.g., at least one of 116a, 116b, and 116c) in the glass melting vessel in a fuel-rich condition. In certain exemplary embodiments the reducing atmosphere (MA') in the melting vessel 14 can comprise less than about 300 ppm of oxygen, such as from about 10 ppm to about 300 ppm of oxygen, including from about 20 ppm to about 200 ppm of oxygen.

The pressure of the reducing atmosphere (MA') in the melting vessel 14 should be greater than the pressure of an atmosphere surrounding the melting vessel, such as at least about 0.15 inches of water greater than the pressure of the atmosphere surrounding the melting vessel, including from about 0.15 to about 0.3 inches of water greater than the pressure of the atmosphere surrounding the melting vessel.

The at least one combustion burner in the melting vessel 14 being operated in a fuel-rich condition should be operated so as to continue to maintain a temperature in the melting vessel 14 above the melting point of the glass melt composition, while at the same time establishing and maintaining a reducing atmosphere (MA') having an oxygen concentration of less than about 1000 ppm in the melting vessel 14, wherein the pressure of the reducing atmosphere in the melting vessel is greater than the pressure of the atmosphere surrounding the melting vessel. The appropriate fuel-rich fuel to oxygen ratio can be extrapolated from the fuel to oxygen ratio used in the operational state, which can be a function of, for example, type of fuel used and glass melt vessel geometry.

For example, when natural gas is used as fuel, the fuel to oxygen molar ratio can range from about 1:2.3 to about 1:2.5 in the operational state and applicants have found that when the fuel to oxygen ratio is adjusted to about 1:1.8, such fuel-rich condition enables the establishment and maintenance of a reducing atmosphere (MA') in melting vessel 14 having a pressure greater than the pressure of the atmosphere surrounding the melting vessel. Accordingly, when natural gas is used as fuel, operating at least one combustion burner in the melting vessel 14 to run at least about 30% fuel-rich, such as from about 30% to about 40% fuel-rich relative to the operational state, can enable the establishment and maintenance of a reducing atmosphere (MA') in melting vessel 14 having a pressure greater than the pressure of the atmosphere surrounding the melting vessel.

In exemplary embodiments disclosed herein, feed gas (FG) is fed into fining vessel 34, such that the pressure of the atmosphere (FA') in the fining vessel 34 is greater than the pressure of the reducing atmosphere in the melting vessel 14. For example, in certain exemplary embodiments, the pressure of the atmosphere (FA') in the fining vessel 34 can be at least about 0.05 inches of water, such as from about 0.05 to about 0.10 inches of water greater than the pressure of the reducing atmosphere in the glass melting vessel 14. Meanwhile, the atmosphere (FA') in the fining vessel 34 can, for example, comprise from about 0.01 to about 1.0 percent oxygen by volume, such as from about 0.05 percent to about 0.5 percent oxygen by volume.

In the meantime, the temperature of fining vessel 34 can be lowered below that of the operational state, such as a temperature of about 1550° C. or lower and temperature of second connecting conduit 38 and/or portion of fining vessel 34 most proximate to second connecting conduit 38 may be lowered to a temperature at or below the softening point of the glass melt composition, such as a temperature below about 1000° C., such as a temperature of from about 970° C. to about 1000° C. Such temperature changes can, for example, be enabled by adjusting the power supplied to flanges (e.g., 136a, 136b, 136c). By so maintaining such temperatures in the fining vessel 34 and/or second connecting conduit 38, which is in fluid communication with fining vessel 34 at or below the softening point of the glass melt composition, glass plug 148 may be established. Once glass plug 148 has been established, glass melt composition comprising molten glass 28 that is downstream of glass plug 148 may be drained from glass manufacturing apparatus 10 through a component of downstream glass manufacturing apparatus 30 that is downstream of fining vessel 34, such as, for example, exit conduit 44.

FIG. 4 shows a portion of the example glass making apparatus and process of FIG. 2, wherein melting vessel 14 and fining vessel 34 are in a second reconditioning state in accordance with embodiments disclosed herein. In the embodiment shown in FIG. 4, drain 158 of melting vessel 14 is unplugged via temporary removal of plug 118, and glass melt composition including molten glass 28 is drained from melting vessel 28 through drain 158. Glass melt composition including molten glass 28 in fining vessel 34 and first connecting conduit 32 that is in fluid communication with melting vessel 14 is also drained from glass manufacturing apparatus 10 through drain 158. Meanwhile, electrodes 122a, 122b, and 122c are powered off during the draining procedure and during at least a portion of the draining procedure, such as when the glass melt composition has been completely drained from the melting vessel 14, the temperature in melting vessel 14 can, for example, be maintained to be at least about 100° C. lower than the temperature of melting vessel 14 in the operational state.

During the draining procedure, the reducing atmosphere (MA') in melting vessel 14 and the atmosphere (FA') in fining vessel 34 as described with reference to FIG. 3, are maintained. Specifically, during the draining procedure, the pressure of the reducing atmosphere (MA') in the melting vessel 14 is greater than a pressure of an atmosphere surrounding the melting vessel and the pressure of the atmosphere (FA') in the fining vessel 34 is greater than the pressure of the reducing atmosphere (MA') in the melting vessel 14. In certain exemplary embodiments, during the draining procedure, the reducing atmosphere (MA') in the melting vessel 14 comprises from about 10 ppm to about 300 ppm of oxygen and the atmosphere (FA') in the fining vessel 34 comprises from about 0.01 to about 1.0 percent oxygen by volume. In the embodiment shown in FIG. 4, plug 138 has been removed from vent 134 in order to prevent over pressurization.

As the glass melt composition comprising molten glass 28 is drained from melting vessel 14, electrodes (e.g., 122a, 122b, and 122c) are exposed to reducing atmosphere (MA') in melting vessel. Reducing atmosphere (MA') protects electrodes from oxidation, particularly when electrodes would otherwise oxidize rapidly at elevated temperatures, such as temperatures above the melting temperature of the glass melt composition. For example, electrodes comprising molybdenum, such as electrodes consisting essentially of molybdenum, are known to oxidize rapidly at temperatures above about 400° C. in non-reducing atmospheres. Maintaining a reducing atmosphere (MA') in melting vessel 14, wherein the pressure of the reducing atmosphere (MA') in the melting vessel 14 is greater than a pressure of an atmosphere surrounding the melting vessel, protects such electrodes from substantial oxidation during the draining procedure.

While the reducing atmosphere (MA') in melting vessel 14 can protect electrodes, such as molybdenum electrodes from substantial oxidation, such atmosphere may adversely affect any component of glass manufacturing apparatus 10, such as fining vessel 34, comprising or formed from a precious metal, such as platinum or an ally thereof, such as a platinum-rhodium alloy. For example, a reducing atmosphere containing some amount of molybdenum or other metal oxide, such as $SnO_2$, can easily react with platinum to form a low melting temperature alloy which can create holes in the platinum system. Accordingly, when fining vessel 34 comprises or is formed from a precious metal, such as platinum or an ally thereof, such as a platinum-rhodium alloy, the pressure of the atmosphere (FA') in the fining vessel 34 is greater than the pressure of the reducing atmosphere (MA') in the melting vessel 14 during the draining procedure in order to prevent the reducing atmosphere (MA') in melting vessel 14 from substantially flowing into fining vessel 34. Conversely, any atmosphere (FA') in fining vessel 34 that flows into melting vessel 14 during the draining procedure is rapidly converted to a reducing atmosphere via operation of at least one combustion burner (e.g., 116a, 116b, 116c) in melting vessel 14 in a fuel-rich condition, thereby enabling protection of melting vessel electrodes (e.g., 122a, 122b, and 122c) from substantial oxidation while simultaneously protecting fining vessel 34 comprising, e.g., platinum, from undesirable alloying.

FIG. 5 shows a portion of the example glass making apparatus and process of FIG. 2, wherein melting vessel 14 and fining vessel 34 are in a third reconditioning state in accordance with embodiments disclosed herein. In the embodiment shown in FIG. 5, plug 120 is removed, plug 118 is reinserted, and raw material delivery device 20 is reconnected to melting vessel 14. Raw material delivery device 20 introduces glass cullet 124 into melting vessel 14, which, as shown in FIG. 5, partially immerses electrodes 122a, 122b, and 122c in the form of melted glass cullet 128. Once electrodes 122a, 122b, and 122c, such as electrodes comprising molybdenum, have been at least partially immersed in the melted glass cullet 128, they may be powered on. Meanwhile, reducing atmosphere (MA') in melting vessel 14 and atmosphere (FA') in fining vessel 34 as described with reference to FIG. 3, are maintained. Specifically, in the embodiment illustrated in FIG. 5, the pressure of the reducing atmosphere (MA') in the melting vessel 14 is greater than a pressure of an atmosphere surrounding the melting vessel and the pressure of the atmosphere (FA') in the fining vessel 34 is greater than the pressure of the reducing atmosphere (MA') in the melting vessel 14.

FIG. 6 shows a portion of the example glass making apparatus and process of FIG. 2, wherein melting vessel 14 and fining vessel 34 are in a fourth reconditioning state in accordance with embodiments disclosed herein. In the embodiment shown in FIG. 6, glass cullet 124 is further introduced into melting vessel 14 such that the level of melted glass cullet 128 fills the entirety of at least the portion of first connecting conduit 32 that is in closest proximity to melting vessel 14. At this point, gas inlet tube 140 may be removed from vent 134 and atmosphere (FA) in fining vessel 34 may be returned to that corresponding to the operational state, as described above with reference to FIG. 2. Meanwhile, reducing atmosphere (MA') in melting vessel 14, as described with reference to FIG. 3, is maintained. Specifically, in the embodiment illustrated in FIG. 6, the pressure of the reducing atmosphere (MA') in the melting vessel 14 is greater than a pressure of an atmosphere surrounding the melting vessel.

Figure 7:
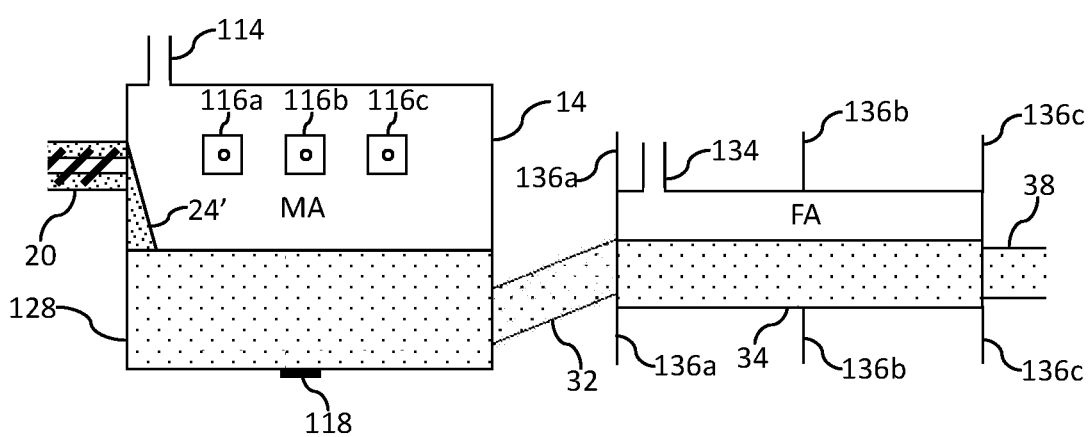
FIG. 7 is a schematic view of the portion of the example glass making apparatus and process of FIG. 2, wherein the glass melting and fining vessels are in a fifth reconditioning state in accordance with embodiments disclosed herein.

FIG. 7 shows a portion of the example glass making apparatus and process of FIG. 2, wherein melting vessel 14 and fining vessel 34 are in a fifth reconditioning state in accordance with embodiments disclosed herein. In the embodiment shown in FIG. 6, glass cullet 124 is further introduced into melting vessel 14 such that the level of melted glass cullet 128 fully immerses electrodes 122a, 122b, and 122c, such as electrodes comprising molybdenum. Subsequent to full immersion of electrodes 122a, 122b, and 122c in melted glass cullet 128, raw materials 24' corresponding to a second glass melt composition may be introduced into melting vessel 14. The second glass melt composition may be the same or different as the original glass melt composition. In addition, subsequent to full immersion of electrodes 122a, 122b, and 122c, combustion burners 116a, 116b, and 116c may be returned to the operational state from the fuel-rich state, such that the atmosphere (MA) in the melting vessel may return to that corresponding to the operational state, as described above with reference to FIG. 2. Meanwhile, the temperature of the fining vessel 34 may be returned to the operational state, as described with reference to FIG. 2, resulting in melting of glass plug 148.

Figure 8:
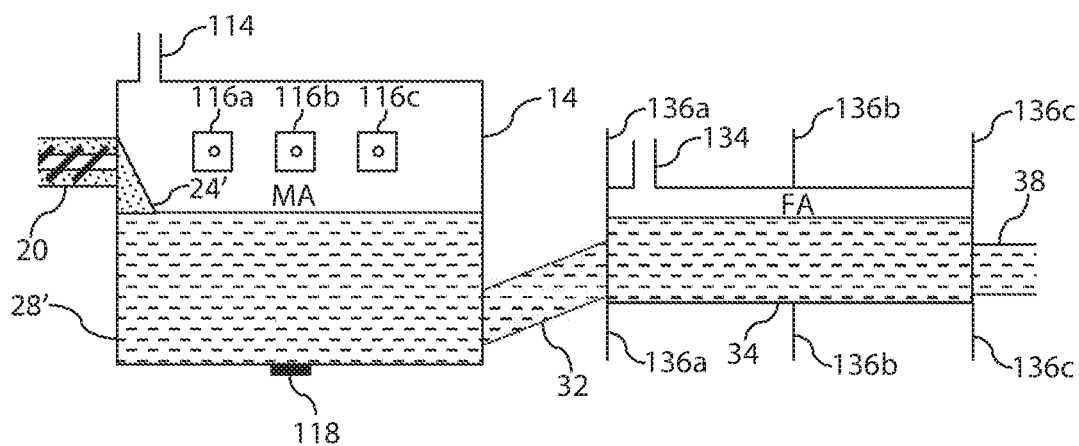
FIG. 8 is a schematic view of the portion of the example glass making apparatus and process of FIG. 2, wherein glass melting and fining vessels are returned to an operational state.

FIG. 8 shows a portion of the example glass making apparatus and process of FIG. 2, wherein melting vessel 14 and fining vessel 34 are returned to an operational state in accordance with embodiments disclosed herein. As shown in FIG. 8, as the glass manufacturing apparatus 10 is refilled with second glass melt composition, melted glass cullet 128 is ultimately flushed from the glass manufacturing apparatus 10 such that glass manufacturing apparatus 10 is restored to the operational state, as described above with reference to FIG. 2, except that second glass melt composition including molten glass 28' (as opposed to original glass melt composition) is being processed.

While the above-described embodiments relate to draining a glass melt composition from melting vessel 14 and fining vessel 34, it is to be understood that embodiments disclosed herein also include those in which at least a portion of glass manufacturing apparatus 10 may be removed from service, such as, for example, removal of at least one of fining vessel 34, first connecting conduit 32, and second connecting conduit 38 are removed from glass manufacturing apparatus 10 for repair and/or replacement. In such embodiments, a glass plug, similar to glass plug 148 shown in FIGS. 3-6, may be established, for example, between melting vessel 13 and first connecting conduit 32 such that fining vessel 34 and first connecting conduit 34 full of glass melt composition may be removed from glass manufacturing apparatus 10 in conjunction with glass melt composition being drained from melting vessel 14.

Figure 9:
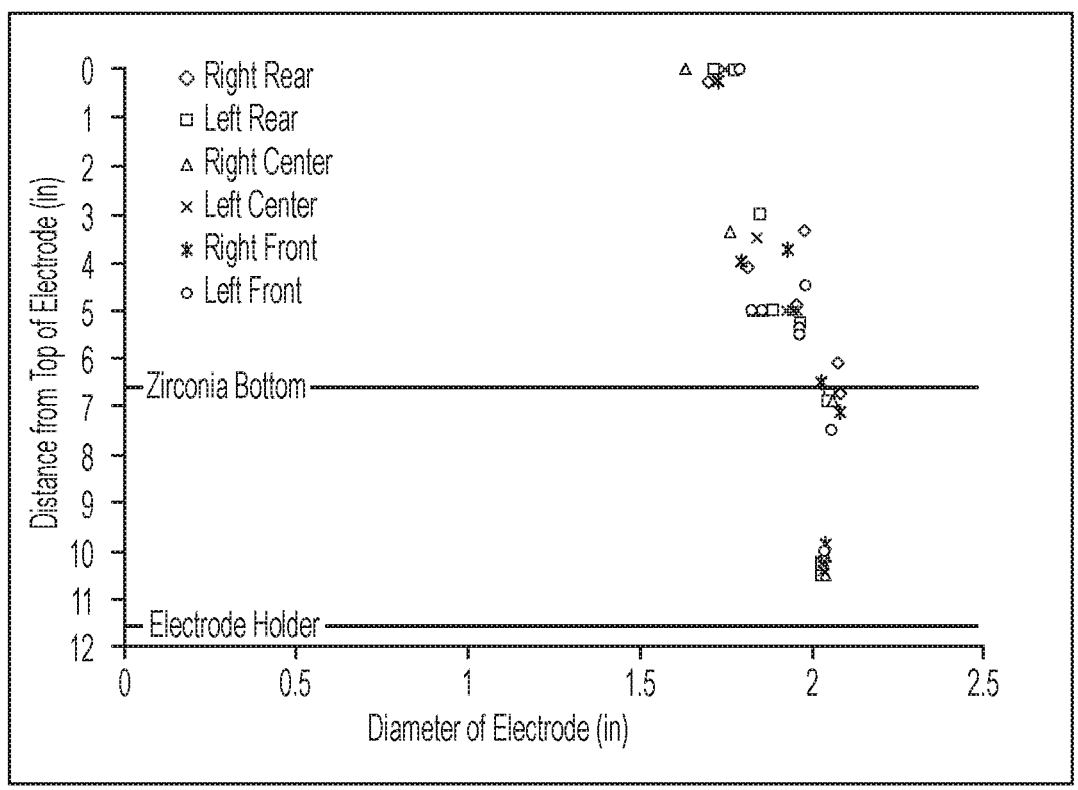
FIG. 9 is a chart showing electrode diameter as a function of distance from top of the electrode during a drain and fill procedure in accordance with embodiments disclosed herein.

FIG. 9 shows a chart showing electrode diameter as a function of distance from top of the electrode during a drain and fill procedure in accordance with embodiments disclosed herein. In the drain and fill procedure corresponding to FIGS. 2-8, a glass melt composition was drained from a glass melting vessel comprising molybdenum electrodes and a zirconia bottom, wherein a reducing atmosphere was maintained at a pressure of about 0.25 inches of water greater than the pressure of the atmosphere surrounding the melting vessel. The reducing atmosphere, having an oxygen concentration of from about 10 ppm to about 300 ppm, was maintained by operating combustion burners in the melting vessel at about a 1.8 ratio of oxygen to natural gas. Once the glass melt composition was drained from the melting vessel, the melting vessel containing the reducing atmosphere was held empty of glass melt composition for a period of about 84 hours at a temperature of about 1500° C. As can be seen from FIG. 9, while some electrode dissolution was observable in the vicinity of the top of the molybdenum electrodes, the electrodes largely remained intact. In contrast, in a non-reducing atmosphere, such as an atmosphere containing approximately the same oxygen concentration as air, such molybdenum electrodes would be expected to entirely corrode away over a period of about 84 hours at a temperature of about 1500° C.

While the above embodiments have been described with reference to a fusion down draw process, it is to be understood that such embodiments are also applicable to other glass forming processes, such as float processes, slot draw processes, up-draw processes, tube drawing processes, and press-rolling processes.

It will be apparent to those skilled in the art that various modifications and variations can be made to embodiment of the present disclosure without departing from the spirit and scope of the disclosure. Thus it is intended that the present disclosure cover such modifications and variations provided they come within the scope of the appended claims and their equivalents.

What is claimed is:

1. A method for reconditioning a glass manufacturing system comprising:
    establishing a reducing atmosphere in a glass melting vessel, and
    draining a glass melt composition from the glass melting vessel while the reducing atmosphere is in the glass melting vessel;
    wherein a pressure of the reducing atmosphere in the glass melting vessel is greater than a pressure of an atmosphere surrounding the glass melting vessel; and
    wherein the establishing the reducing atmosphere in the glass melting vessel comprises operating at least one combustion burner in the glass melting vessel in a fuel-rich condition.

2. The method of claim 1, wherein the glass melting vessel is in fluid communication with a downstream glass manufacturing apparatus comprising a fining vessel, wherein, during the step of draining the glass melt composition from the glass melting vessel, a pressure of an atmosphere in the fining vessel is greater than the pressure of the reducing atmosphere in the glass melting vessel.

3. The method of claim 2, wherein the atmosphere in the fining vessel comprises from about 0.1 to about 1.0 percent oxygen by volume.

4. The method of claim 3, wherein the method comprises feeding a gas comprising less than about 1.0 percent oxygen by volume into the fining vessel.

5. The method of claim 4, wherein the gas comprising less than about 1.0 percent oxygen by volume comprises at least about 99% nitrogen by volume.

6. The method of claim 2, wherein the fining vessel comprises platinum or an alloy thereof.

7. The method of claim 6, wherein the fining vessel comprises a platinum-rhodium alloy.

8. The method of claim 2, wherein the method further comprises draining molten glass from the fining vessel while the reducing atmosphere is in the glass melting vessel and while the pressure of the atmosphere in the fining vessel is greater than the pressure of the reducing atmosphere in the glass melting vessel.

9. The method of claim 8, wherein at least a portion of the molten glass drained from the fining vessel is drained through the glass melting vessel.

10. The method of claim 8, wherein the method further comprises establishing a glass plug in the fining vessel or in a conduit in fluid communication with the fining vessel by maintaining a portion of the fining vessel or a conduit in fluid communication with the fining vessel at a temperature at or below the softening point of the glass melt composition.

11. The method of claim 10, wherein at least a portion of the molten glass drained from the fining vessel is drained through the glass melting vessel.

12. The method of claim 2, wherein the pressure of the reducing atmosphere in the glass melting vessel is at least about 0.25 inches of water greater than the pressure of the atmosphere surrounding the glass melting vessel.

13. The method of claim 12, wherein the pressure of the atmosphere in the fining vessel is at least about 0.05 inches of water greater than the pressure of the reducing atmosphere in the glass melting vessel.

14. The method of claim 1, wherein the melting vessel comprises at least one electrode comprising molybdenum.

15. The method of claim 1, wherein the reducing atmosphere comprises from about 10 ppm to about 300 ppm of oxygen.

16. The method of claim 1, wherein, subsequent to draining the glass melt composition from the glass melting vessel, a second glass melt composition is introduced into the glass melting vessel.

17. The method of claim 16, wherein the melting vessel comprises at least one electrode comprising molybdenum that is powered off while draining the glass melt composition from the glass melting vessel.

18. The method of claim 17, wherein a glass cullet is introduced into the glass melting vessel prior to introducing the second glass melt composition into the glass melting vessel.

19. The method of claim 18, wherein the glass cullet is introduced into the glass melting vessel until it at least partially immerses the at least one electrode comprising molybdenum and the at least one electrode comprising molybdenum is powered on subsequent to being at least partially immersed by the glass cullet.

20. The method of claim 19, wherein the glass cullet is introduced into the glass vessel until it at least fully immerses the at least one electrode comprising molybdenum and second glass melt composition is introduced into the glass melting vessel subsequent to the at least one electrode being fully immersed in the glass cullet.

* * * * *